(12) United States Patent
Ye et al.

(10) Patent No.: US 12,031,066 B2
(45) Date of Patent: Jul. 9, 2024

(54) INSULATED WIRE AND PREPARATION METHOD THEREOF, COIL AND ELECTRONIC/ELECTRICAL DEVICE

(71) Applicant: Well Ascent Electronic (Ganzhou) Co., Ltd., Jiangxi (CN)

(72) Inventors: Huimin Ye, Jiangxi (CN); Zuomao Zhu, Jiangxi (CN)

(73) Assignee: Well Ascent Electronic (Ganzhou) Co., Ltd., Ganzhou (CN)

( * ) Notice: Subject to any disclaimer, the term of this patent is extended or adjusted under 35 U.S.C. 154(b) by 227 days.

(21) Appl. No.: 17/840,462

(22) Filed: Jun. 14, 2022

(65) Prior Publication Data

US 2022/0306921 A1    Sep. 29, 2022

Related U.S. Application Data

(63) Continuation of application No. PCT/CN2022/074023, filed on Jan. 26, 2022.

(30) Foreign Application Priority Data

Feb. 24, 2021 (CN) .......................... 202110207170.7

(51) Int. Cl.
*H01B 7/02* (2006.01)
*C09D 161/16* (2006.01)
(Continued)

(52) U.S. Cl.
CPC .......... *C09J 179/08* (2013.01); *C09D 161/16* (2013.01); *C09J 161/16* (2013.01); *H01B 3/427* (2013.01); *H01B 13/145* (2013.01); *H01B 1/02* (2013.01)

(58) Field of Classification Search
CPC . H01B 1/023; H01B 3/04; H01B 3/30; H01B 3/305; H01B 3/306; H01B 3/308; H01B 3/427; H01B 5/06; H01B 7/02; H01B 7/0216; H01B 7/0225; H01B 7/0275; H01B 7/04; H01B 7/303; H01B 13/06; H01B 13/0013; H01B 13/016; H01B 13/065; H01B 13/14; H01B 13/148; B23B 15/02;
(Continued)

(56) References Cited

U.S. PATENT DOCUMENTS 10,529,463 B2 *  1/2020  Yamoto ..................... H02K 3/12
2009/0202831 A1 *  8/2009  Honda ............... C08G 73/1071
528/289

(Continued)

FOREIGN PATENT DOCUMENTS

CN    106489183 A    3/2017
CN    108292542 A    7/2018
(Continued)

OTHER PUBLICATIONS

International Search Report of PCT/CN2022/074023.
Written Opinion of PCT/CN2022/074023.

*Primary Examiner* — William H. Mayo, III

(57) ABSTRACT

Example implementations include an insulated wire and a preparation method thereof, a coil and an electronic/electrical device. A bonding layer containing PEEK nano-powder is arranged between a conductor and a PEEK resin insulating layer, and a bonding agent for forming the bonding layer contains organic solvent, polyamide-imide resin and PEEK nano-powder material which are mixed.

20 Claims, 2 Drawing Sheets

(51) Int. Cl.
    *C09J 161/16*     (2006.01)
    *C09J 179/08*     (2006.01)
    *H01B 3/42*     (2006.01)
    *H01B 13/14*     (2006.01)
    *H01B 1/02*     (2006.01)

(58) Field of Classification Search
    CPC .......... B23B 15/08; B23B 27/08; H02K 3/30; H02K 3/306; H02K 15/04
    USPC ................. 174/110 R–120 SR; 428/383, 379
    See application file for complete search history.

(56) References Cited

U.S. PATENT DOCUMENTS

| | | | | |
|---|---|---|---|---|
| 2013/0014971 | A1* | 1/2013 | Muto | H01B 7/2813 |
| | | | | 174/110 SR |
| 2013/0037304 | A1* | 2/2013 | Ikeda | H01B 3/30 |
| | | | | 174/110 N |
| 2015/0027748 | A1* | 1/2015 | Fukuda | H01B 3/306 |
| | | | | 174/120 C |
| 2015/0221412 | A1* | 8/2015 | Caudill | H01B 3/427 |
| | | | | 428/339 |
| 2017/0084361 | A1* | 3/2017 | Oya | H02K 3/30 |
| 2018/0268962 | A1* | 9/2018 | Ikeda | H01B 7/0225 |
| 2018/0358856 | A1* | 12/2018 | Oya | H01B 7/0009 |

FOREIGN PATENT DOCUMENTS

| | | | | |
|---|---|---|---|---|
| CN | 110136895 A | * | 8/2019 | ............ H01B 13/06 |
| CN | 113012847 A | | 6/2021 | |
| JP | 2010157433 A | | 7/2010 | |
| JP | 2017117681 A | | 6/2017 | |

\* cited by examiner

Applying a bonding agent to a surface of a conductor to form a bonding layer covering the conductor and obtain a core wire Extruding a PEEK resin material outside the bonding layer of the core wire to form a PEEK resin insulating layer and obtain an insulated wire

INSULATED WIRE AND PREPARATION METHOD THEREOF, COIL AND ELECTRONIC/ELECTRICAL DEVICE

CROSS-REFERENCE TO RELATED APPLICATIONS

This application is a continuation application of International Patent Application No.: PCT/CN2022/074023, which claims priority to Chinese Patent Application No. 202110207170.7, filed with the Chinese Patent Office on Feb. 24, 2021 and entitled "INSULATED WIRE AND PREPARATION METHOD THEREOF, COIL AND ELECTRONIC/ELECTRICAL DEVICE." The above-referenced applications are incorporated herein by reference in their entirety.

TECHNICAL FIELD

The present application relates to the technical field of wire and cable production, and in particular to an insulated wire resistant to high frequency and high voltage and a preparation method thereof, a coil and an electronic/electrical device.

BACKGROUND

Insulated wires formed by coating conductors with insulating films are assembled into coils in different electrical and electronic devices. Coils are especially commonly used in electrical and electronic devices represented by motors and transformers. Polyamide-imide (PAI) has superior mechanical properties, with a tensile strength of higher than 172 MPa, and a heat deflection temperature of 274° C. under a load of 1.8 MPa. Polyamide-imide enameled copper wires (AIW) formed by coating bare copper conductors with PAI resin has excellent insulation, heat resistance and mechanical properties.

With increasingly high requirements of insulated wires for resistance to high frequency and high voltage, enameled wires are also coated with a layer of polyetheretherketone (PEEK), thereby greatly improving their temperature resistance and radiation resistance.

The production process of traditional PEEK insulated wires is usually to directly coat bare copper conductors with a PEEK resin insulating layer or coat PAI-coated AIW wires with a PEEK resin insulating layer to form PEEK insulated wires. PEEK is a single-component material that will form a lubricating surface layer after being heated, with very weak adhesion to other materials, and a PAI coating also forms a smooth surface layer after being cross-linked through baking; both AIW and PEEK, through respective reactions, form smooth surface layers which are difficult to bond with each other firmly; therefore, cracking and detachment often occur to traditional PEEK insulated wires during application, resulting in insulation lack of wire rods.

SUMMARY

In view of this, the present application is expected to provide an insulated wire and a preparation method thereof, a coil using the insulated wire, and an electrical/electronic device using the coil, with excellent adhesion between insulating layers, which can effectively solve the problems of detachment during stretching and cracking during winding.

The aforesaid purpose is realized by the following technical solution:

An insulated wire includes a conductor, and a bonding layer and a PEEK resin insulating layer arranged outside the conductor in turn, wherein the bonding layer is located between the conductor and the polyetheretherketone (PEEK) resin insulating layer; the PEEK resin insulating layer is made of a PEEK resin material; and a bonding agent for forming the bonding layer includes organic solvent, polyamide-imide (PAI) resin and PEEK nano-powder material.

Optionally, a PAI primer layer is formed between the conductor and the bonding layer by sintering PAI resin on the conductor; but in consideration of the cost, more preferably, the bonding layer is directly applied to the surface of the conductor, without the need of separately arranging the PAI primer layer.

Further, the bonding agent is applied to the surface of the bare conductor to form the bonding layer, with an average thickness between 5 μm and 30 μm, and preferably between 10 μm and 20 μm.

Further, the organic solvent includes nitrogen-containing polar solvent, ether-based solvent, xylene or a mixture thereof; preferably, the nitrogen-containing polar solvent is specifically selected from one or more of N-methyl-2-pyrrolidone, N,N-dimethylformamide, N,N-dimethylacetamide, tetramethylurea and dimethylethyleneurea; preferably, the ether-based solvent is specifically selected from one or more of diethylene glycol dimethyl ether, triethylene glycol dimethyl ether, tetraethylene glycol dimethyl ether, diethylene glycol and triethylene glycol.

Further, the PEEK nano-powder has an average particle size of 50-100 nm, and a dispersant is preferably added to disperse the PEEK nano-powder more uniformly in an organic solvent dispersion system.

Further, the bonding agent includes, based on parts by weight, 50-80 parts of organic solvent, 20-30 parts of polyamide-imide resin and 2-8 parts of PEEK nano-powder material.

Further, the PEEK resin insulating layer has a thickness of 10-1,000 μm, preferably 25-750 μm, in particular preferably 30-500 μm, and especially 50-250 μm.

Further, the PEEK resin material forming the PEEK resin insulating layer has a glass transition temperature of 320-360° C., and a melt viscosity at 400° C. of 120-140 pa·s, and preferably 130 pa·s; the PEEK resin material has favorable melt extrusion effects, and balanced mechanical properties and machinability within this melt viscosity range.

Further, the insulated wire of the present application can be designed to flat, circular or other shapes.

The present application also discloses a method for preparing the insulated wire, specifically including the following steps:

step 1, applying the bonding agent outside the conductor to form the bonding layer covering the conductor and obtain a core wire; and step 2, extruding the PEEK resin material outside the bonding layer of the core wire to form the PEEK resin insulating layer and obtain an insulated wire.

Specifically, in step 1, the bonding agent is applied to the bare conductor by an enameling machine, during which the organic solvent in the bonding agent volatilizes, and the bonding agent is cured to form the bonding layer. Then, before entering a head of a screw extruder, the core wire is preheated at a temperature of higher than 400° C., during which the organic solvent in the bonding agent further volatilizes.

Specifically, in step 2, the PEEK resin material is heated to a molten state. Then, with the rotation of a screw of the screw extruder, the PEEK resin material flows uniformly inside a barrel. The preheated core wire is placed in front of the head of the screw extruder, the surface of the core wire is coated with the PEEK resin material evenly through molds of different specifications at the head, and the PEEK resin insulating layer is formed after cooling and crystallization.

Further, in step 1, the bonding agent is prepared by the following steps: dissolving polyamide-imide resin in the organic solvent, and heating and stirring the solution; adding the PEEK nano-powder material and fully dissolving the solution under stirring; and adding the organic solvent to adjust the solid content and viscosity.

Further, in step 2, the PEEK resin insulating layer is formed through melt extrusion at a temperature of 380-410° C. During extrusion, the melted PEEK resin material can contact and fuse with the PEEK nano-powder material in the bonding layer, thereby realizing firm adhesion between the bonding layer and the PEEK resin insulating layer.

Further, the bonding agent has a solid content of 20-40%, and a viscosity at 30° C. of 2,500-3,500 cp, preferably 3,000 cp.

Preferably, in step 1, the bonding agent is applied to the surface of the bare conductor to form the bonding layer covering the bare conductor and obtain the core wire.

Optionally, in step 1, the PAI primer layer is formed on the bare conductor.

The bonding agent is applied to the PAI primer layer to form the bonding layer covering the conductor and obtain the core wire.

Further, the bare conductor provided in step 1 is made of copper, aluminum and an alloy thereof.

The present application further provides a coil including the insulated wire of the present application.

The present application further provides an electronic/electrical device including the coil of the present application.

DESCRIPTION OF EMBODIMENTS

The technical solution of the present application will be further described in detail below in conjunction with specific embodiments. The following embodiments are intended to illustrate and explain the present application only, and should not be interpreted as a limitation to the protection scope of the present application. All technologies realized on the basis of the aforesaid contents of the present application fall within the protection scope of the present application.

Figure 1:
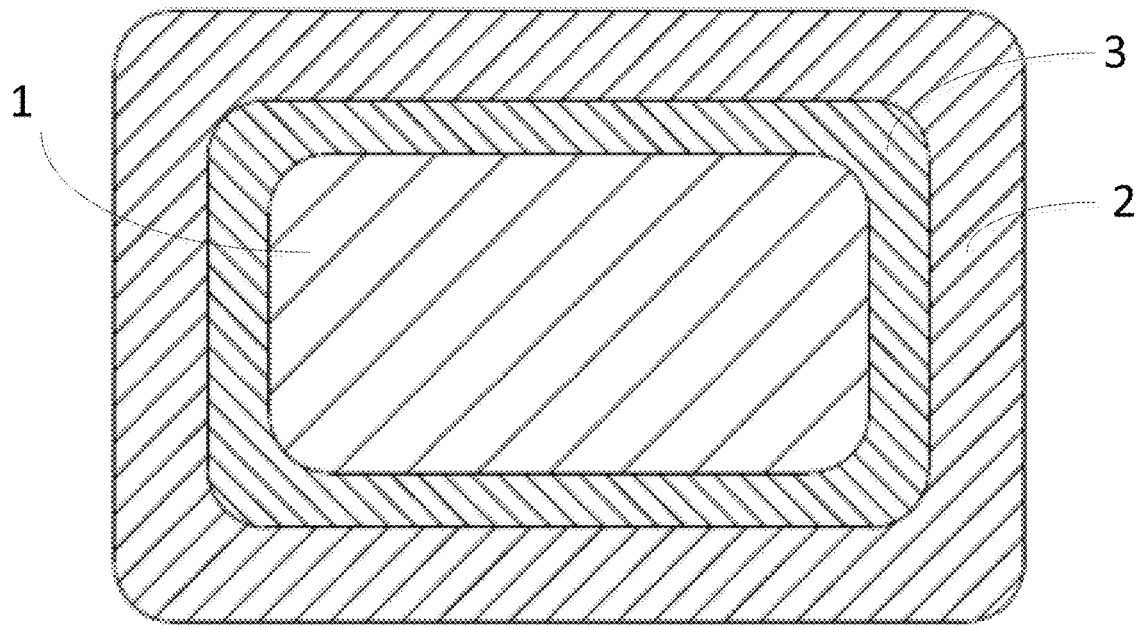
FIG. 1 is a sectional structural view of an insulated wire of the present application.
Figure 2:
FIG. 2 is a flow chart of a method for preparing an insulated wire of the present application.

Referring to FIGS. 1-2, a method for preparing the insulated wire of the present application specifically includes the following steps:

step 1, a bonding agent is applied outside a bare conductor 1 by an enameling machine, during which an organic solvent in the bonding agent volatilizes, and the bonding agent is cured to form a bonding layer 2 covering the bare conductor 1 and obtain a core wire; then, before entering a head of a screw extruder, the core wire is preheated at a temperature of higher than 400° C., during which the organic solvent in the bonding agent further volatilizes;

wherein, the bonding agent is prepared specifically as follows: dissolving polyamide-imide resin in the organic solvent, and heating and stirring the solution; adding PEEK nano-powder material and fully dissolving the solution under stirring; and adding the organic solvent to adjust the solid content and viscosity to obtain the bonding agent.

step 2, a polyetheretherketone (PEEK) resin material is added to a barrel of the screw extruder and heated to a molten state at 380-410° C.; then, with the rotation of a screw of the screw extruder, the PEEK resin material flows uniformly inside the barrel; the preheated core wire is placed in front of the head of the screw extruder, and the surface of the core wire is coated with the PEEK resin material evenly through molds of different specifications at the head, and a PEEK resin insulating layer 3 is formed after cooling and crystallization to obtain the insulated wire with a structure as shown in FIG. 1.

[Bare Conductor]

The bare conductor 1 of the present application may have a cross-section as a circle or a rectangle, including a rectangle with rounded corners, and is made of copper, aluminum and their alloys. For welding considerations, a low-oxygen copper or oxygen-free copper conductor with an oxygen content of less than 30 ppm is preferable.

[Bonding Layer]

The bonding layer 2 of the present application may be directly applied to the bare conductor 1. A PAI primer layer may be arranged on the bare conductor 1 by applying PAI varnish to the conductor and baking the varnish. But in consideration of the cost, more preferably, the bonding layer is directly applied to the surface of the conductor, without the need of separately arranging the PAI primer layer. The bonding layer is mainly made of PAI resin, which can achieve common layer insulation in the prior art, without the need of forming the separate PAI primer layer through baking on the surface layer of the bare conductor.

The bonding agent includes organic solvent, polyamide-imide (PAI) resin and PEEK nano-powder material; the bonding agent includes, based on parts by weight, 50-80 parts of organic solvent, 20-30 parts of polyamide-imide resin and 2-8 parts of PEEK nano-powder material.

For selection of the organic solvent, types that can dissolve PAI resin and well disperse PEEK nano-powder in a PAI resin matrix are taken into consideration, including nitrogen-containing polar solvent, ether-based solvent, xylene or a mixture thereof, wherein the nitrogen-containing polar solvent is specifically selected from one or more of N-methyl-2-pyrrolidone, N,N-dimethylformamide, N,N-dimethylacetamide, tetramethylurea and dimethylethyleneurea; the ether-based solvent is specifically selected from one or more of diethylene glycol dimethyl ether, triethylene glycol dimethyl ether, tetraethylene glycol dimethyl ether, diethylene glycol and triethylene glycol.

A dispersant may also be added to well disperse the PEEK nano-powder material in the organic solvent. The dispersant is a surfactant commonly used in the field, and further preferably selected from one or more of cetyltrimethylammonium bromide, alkylphenol ethylene oxide condensate emulsifier, sodium dodecyl sulfate, sodium dodecyl sulfonate and sodium dodecylbenzene sulfonate.

For selection of PAI resin, considering the replacement of the primer layer with the bonding layer, in order to obtain good tensile and bending properties, PAI is preferably amorphous resin with a glass transition temperature between 200° C. and 300° C. If the glass transition temperature is too low, the electrical properties may be degraded in a heat resistance test. If the glass transition temperature is too high, residues will be possibly left due to incomplete melting during welding, thereby reducing the weldability. An elastic modulus of 100-1,000 MPa, and preferably 300-800 MPa, provides good mechanical strength and bending properties.

The bonding layer 2 has a thickness between 5 μm and 30 μm, and further preferably between 10 μm and 20 μm. If the bonding layer 2 is too thin, its adhesion to the bare conductor and the PEEK insulating layer is insufficient. If the bonding layer 2 is too thick, the wire is difficult to bend in a bending process.

Table 1 shows comparative experiment data of different bonding layer thicknesses vs adhesion. It can be seen from a comparative experiment described below that all test results are recorded as "Pass" when the thickness of the bonding layer 2 of the insulated wire of the present application is between 5 μm and 30 μm, and the adhesion-losing length is short, indicating that the adhesion of the bonding layer is excellent. The adhesion-losing length is herein defined as the length of an insulating film losing adhesion, starting from a notch. The smaller the length value, the better the adhesion of the bonding layer.

The PEEK nano-powder of the present application can be prepared by common methods in the prior art, such as cryopulverization, sol-gel and dissolution-precipitation, with an average particle size of 50-100 nm. The PEEK nano-powder used in the present application is commercially available.

[PEEK Resin Insulating Layer]

Based on considerations of the insulation and extrusion properties, the PEEK resin material has a glass transition temperature of 320-360° C., and a melt viscosity at 400° C. of 120-140 pa·s, and preferably 130 pa·s; the PEEK resin material has favorable melt extrusion effects, and balanced mechanical properties and machinability within this melt viscosity range. PEEK resin insulating layers with glass transition temperatures and melt indexes satisfying different conditions can be obtained by regulating molecular weights and modifying a resin system. The PEEK resin insulating layer has a thickness of 10-1,000 μm, preferably 25-750 μm, in particular preferably 30-500 μm, and especially 50-250 μm.

The implementation process of the present application will be illustrated below through the specific embodiments, and implementation effects are fully evaluated. Unless otherwise stated, all raw materials and reagents used in these embodiments are commercially available or can be prepared by known methods.

TABLE 1

Performance tests of different bonding layer for insulated wires

| | | Bonding layer verification plan | | | Test result | | |
|---|---|---|---|---|---|---|---|
| Plan | Conductor | PAI layer thickness | Bonding layer thickness | PEEK layer thickness | Adhesion-losing length | U-bending test | Winding test |
| Instance 1 | TU1 oxygen-free copper | N/A | N/A | 100 μm | 3.20 mm | Fail | Fail |
| Instance 2 | TU1 oxygen-free copper | N/A | 5 μm | 100 μm | 1.85 mm | Pass | Pass |
| Instance 3 | TU1 oxygen-free copper | N/A | 10 μm | 100 μm | 1.30 mm | Pass | Pass |
| Instance 4 | TU1 oxygen-free copper | N/A | 15 μm | 100 μm | 0.90 mm | Pass | Pass |
| Instance 5 | TU1 oxygen-free copper | N/A | 15 μm (bonding layer + 5 g of surfactant) | 100 μm | 1.97 mm | Pass | Pass |
| Instance 6 | TU1 oxygen-free copper | N/A | 20 μm | 100 μm | 1.45 mm | Pass | Pass |
| Instance 7 | TU1 oxygen-free copper | N/A | 20 μm (no PEEK nano-powder particles added) | 100 μm | 15.0 mm | Fail | Fail |
| Instance 8 | TU1 oxygen-free copper | N/A | 25 μm | 100 μm | 1.50 mm | Pass | Pass |
| Instance 9 | TU1 oxygen-free copper | N/A | 30 μm | 100 μm | 1.75 mm | Pass | Pass |
| Instance 10 | TU1 oxygen-free copper | N/A | 35 μm | 100 μm | 1.65 mm | Pass | Pass |
| Instance 11 | TU1 oxygen-free copper | N/A | 10 μm | 200 μm | 1.67 mm | Pass | Pass |
| Instance 12 | TU1 oxygen-free copper | N/A | 15 μm | 200 μm | 1.30 mm | Pass | Pass |
| Instance 13 | TU1 oxygen-free copper | N/A | 20 μm | 200 μm | 1.50 mm | Pass | Pass |

EXAMPLE 1: PREPARATION OF INSULATED WIRE

Preparation of Bonding Agent 25 g of modified polyamide-imide resin was dissolved in 50 ml of N-methylpyrrolidone (NMP) and xylene (V/V 1/1) mixed solution, the solution was heated and stirred, then 5 g of PEEK nano-powder material with an average particle size of 50-100 nm was added and fully dissolved under stirring, and 25 ml of N-methylpyrrolidone and xylene mixed solution was added to adjust the solid content and viscosity.

Application of Bonding Layer

The bonding agent was applied to a bare flat copper conductor to a thickness of 15 μm by an enameling machine, during which an organic solvent in the bonding agent volatilized, the bonding agent was cured to form a bonding layer and obtain a core wire, and then the core wire was preheated to 400° C.

Formation of PEEK Resin Insulating Layer Through Extrusion

A PEEK resin material with a glass transition temperature of 340° C. was provided. The PEEK resin material was added to a barrel of a screw extruder and heated to 380° C. in a molten state. Then, with the rotation of a screw of the screw extruder, the PEEK resin material flowed uniformly inside the barrel. The preheated core wire was placed in front of a head of the screw extruder, the surface of the core wire was coated with the PEEK resin material evenly through molds at the head, and a 100 μm-thick PEEK resin insulating layer was formed after cooling and crystallization to obtain a flat insulated wire.

EXAMPLE 2: PREPARATION OF INSULATED WIRE

Compared with example 1, before the bonding layer was formed through application, a 10 μm PAI primer layer was formed on the bare copper conductor. Other technical features are the same as those in example 1, and will not be repeated here.

EXAMPLE 3: PREPARATION OF INSULATED WIRE

Compared with example 1, 5 g of cetyltrimethylammonium bromide as a surfactant was also added to the prepared bonding agent. Other technical features are the same as those in example 1, and will not be repeated here.

EXAMPLE 4: PREPARATION OF INSULATED WIRE

Compared with example 1, the thickness of the bonding layer was 25 μm. Other technical features are the same as those in example 1, and will not be repeated here.

EXAMPLE 5: PREPARATION OF INSULATED WIRE

Compared with example 1, the thickness of the PEEK resin insulating layer was 200 μm. Other technical features are the same as those in example 1, and will not be repeated here.

COMPARATIVE EXAMPLE 1

A bare copper conductor was directly coated with a 100 μm-thick PEEK resin insulating layer through melt extrusion to obtain a comparative wire.

EXPERIMENTAL EXAMPLE: CHARACTERIZATION AND TESTING

1. Adhesion Test 300 mm of insulated wires obtained in examples 1-5 and comparative example 1 were taken as samples respectively. The samples were placed between two clamps and kept on the same axis as the clamps, with both ends clamped; the samples were stretched by 20% at a rate of 300 mm/min, and checked for the adhesion-losing length of films. For this test method, the adhesion of the films is excellent if the adhesion-losing length is less than 2 mm.

2. Bending Machinability Test

A U-bending test and a winding test were conducted for the insulated wires of examples 1-5 and comparative example 1 respectively by the following methods.

Figure 3:
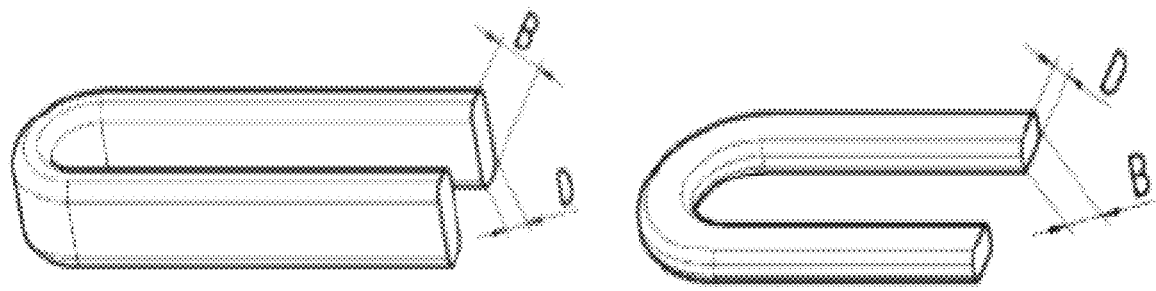
FIG. 3 is a schematic diagram of a U-bending test on the insulated wire in examples and a comparative example of the present application.

U-bend test: As shown in FIG. 3, two 500 mm-long straight insulated wires were bended by 180±2° around a polished test spindle. One was flat-wise wound (spindle diameter=2 times the wire thickness), and the other was edgewise wound (spindle diameter=2 times the wire width). In FIG. 3, "B" and "D" represent the width and thickness of the insulated wires respectively.

In this test, after flat-wise winding and edgewise winding, products having smooth surfaces without cracks were recorded as "Pass", while those having cracked surfaces were recorded as "Fail".

Figure 4:
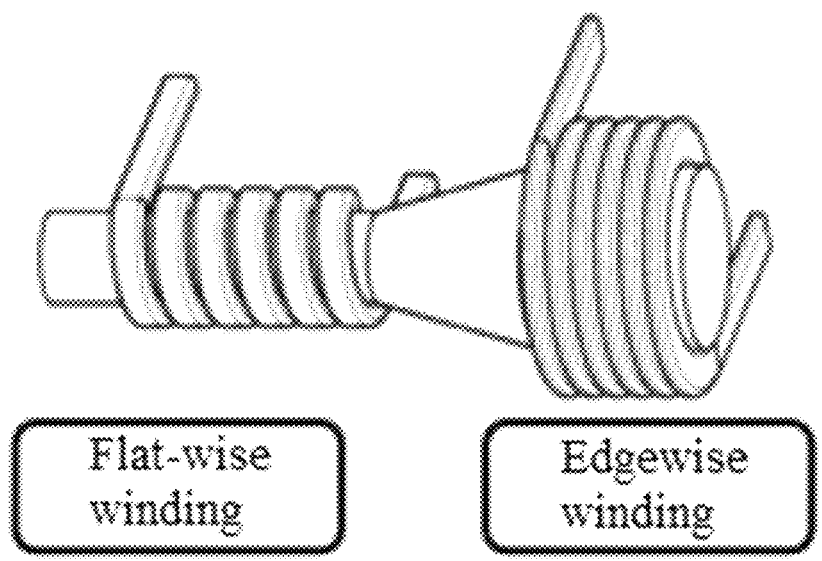
FIG. 4 is a schematic diagram of a winding test on the insulated wire in examples and a comparative example of the present application.

Winding test: As shown in FIG. 4, two 500 mm-long straight insulated wires were wound by 6 turns around a polished test spindle. One was flat-wise wound (spindle diameter=2 times the wire thickness), and the other was edgewise wound (spindle diameter=2 times the wire width). Individual coils should be wound closely in contact with each other, with a maximum clearance of ≤2 mm.

In this test, after flat-wise winding and edgewise winding, products having smooth surfaces without cracks were recorded as "Pass", while those having cracked surfaces were recorded as "Fail".

TABLE 2

| Performance tests of insulated wires | | | |
|---|---|---|---|
| | Adhesion-losing length | U-bending test | Winding test |
| Example 1 | <2 mm | Pass | Pass |
| Example 2 | <2 mm | Pass | Pass |
| Example 3 | <2 mm | Pass | Pass |
| Example 4 | <2 mm | Pass | Pass |
| Example 5 | <2 mm | Pass | Pass |
| Comparative Example 1 | >2 mm | Fail | Fail |

These examples and test results show that the insulated wire of the present application has favorable machinability, and excellent adhesion between insulating layers, and can effectively solve the problems of detachment during stretching and cracking during winding.

The present application has the following beneficial effects:

The present application provides an insulated wire; the bonding layer containing PEEK nano-powder is arranged between the conductor and the PEEK resin insulating layer, and the bonding agent for forming the bonding layer contains organic solvent, polyamide-imide resin and PEEK nano-powder material which are mixed. The bonding layer can be well bonded with both the bare conductor material and the PEEK resin insulating layer, so that the produced insulated wire rod has good adhesion; in addition, after adhesion and curing, the bonding layer is mainly made of PAI resin, which can achieve common layer insulation in the prior art, without the need of forming a separate PAI primer layer through baking on the surface layer of the bare conductor.

Though the present application is described in detail by means of these examples, the foregoing are only for those skilled in the art to understand the present application more easily, rather than limiting the implementation scope of the present application. Therefore, all equivalent changes and modifications made according to the shape and structure features and the spirit of claims of the present application still fall within the scope of the present application.

What is claimed is:

1. An insulated wire, comprising a conductor, and a bonding layer and a PEEK resin insulating layer arranged outside the conductor in turn,
   the bonding layer is located between the conductor and the PEEK resin insulating layer;
   the PEEK resin insulating layer is made of a PEEK resin material; and
   the bonding layer is formed by curing a bonding agent, which comprises organic solvent, polyamide-imide resin and PEEK nano-powder material which are mixed;
   the bonding agent comprises, based on parts by weight, 50-80 parts of organic solvent, 20-30 parts of polyamide-imide resin and 2-8 parts of PEEK nano-powder material;
   a viscosity at 30° C. of 3,000 cp.

2. The insulated wire of claim 1, wherein the bonding layer has a thickness of 10-20 μm.

3. The insulated wire of claim 1, wherein the bonding agent also comprises a dispersant, which accounts for 1-3% by weight in the bonding agent; and
   the dispersant is selected from one or more of cetyltrimethylammonium bromide, alkylphenol ethylene oxide condensate emulsifier, sodium dodecyl sulfate, sodium dodecyl sulfonate and sodium dodecylbenzene sulfonate.

4. The insulated wire of claim 1, wherein the organic solvent comprises nitrogen-containing polar solvent, ether-based solvent, xylene or a mixture thereof;
   the nitrogen-containing polar solvent is selected from one or more of N-methyl-2-pyrrolidone, N,N-dimethylformamide, N,N-dimethylacetamide, tetramethylurea and dimethylethyleneurea; and
   the ether-based solvent is selected from one or more of diethylene glycol dimethyl ether, triethylene glycol dimethyl ether, tetraethylene glycol dimethyl ether, diethylene glycol and triethylene glycol.

5. The insulated wire of claim 1, wherein
   the polyamide-imide resin is amorphous resin with a glass transition temperature between 200° C. and 300° C.; and
   the polyamide-imide resin has an elastic modulus of 300-800 MPa.

6. The insulated wire of claim 1, wherein
   the PEEK resin material has a glass transition temperature of 320-360° C., and a melt viscosity at 400° C. 130 pa·s.

7. The insulated wire of claim 1, wherein
   the PEEK resin insulating layer has a thickness of 50-250 μm.

8. The insulated wire of claim 1, wherein the PEEK nano-powder material has a particle size of 50-100 nm.

9. The insulated wire of claim 1, wherein
   the conductor is a bare conductor, the bonding agent is applied to the surface of the conductor to form the bonding layer covering the bare conductor.

10. The insulated wire of claim 1, wherein
    the conductor is a bare conductor;
    a PAI primer layer is formed on the surface of the bare conductor; and
    the bonding agent is applied to the PAI primer layer to form the bonding layer covering the conductor.

11. The insulated wire of claim 1, wherein
    the conductor has a cross-section as a circle, a rectangle, or a rectangle with rounded corners; and
    the conductor is made of copper, aluminum or an alloy thereof.

12. A coil, comprising the insulated wire of claim 1.

13. An electronic/electrical device, comprising the coil of claim 12.

14. A method for preparing an insulated wire, comprising:
    step 1, applying a bonding agent to a surface of a conductor to form a bonding layer covering the conductor and obtain a core wire; and
    step 2, extruding a PEEK resin material outside the bonding layer of the core wire to form a PEEK resin insulating layer and obtain an insulated wire;
    in step 1, the bonding agent is prepared by the following steps:
    dissolving polyamide-imide resin in the organic solvent, and heating and stirring the solution; and
    adding the PEEK nano-powder material and dissolving the solution under stirring to obtain the bonding agent;
    the bonding agent comprises, based on parts by weight, 50-80 parts of organic solvent, 20-30 parts of polyamide-imide resin and 2-8 parts of PEEK nano-powder material;
    a viscosity at 30° C. of 3,000 cp;
    after the step of adding the PEEK nano-powder material and dissolving the solution under stirring, further comprising:
    adding the organic solvent, and preferably, a mixture of N-methylpyrrolidone and xylene to adjust the solid content and viscosity;
    adding the dispersant, wherein
    the dispersant is selected from one or more of cetyltrimethylammonium bromide, an alkylphenol ethylene oxide condensate emulsifier, sodium dodecyl sulfate, sodium dodecyl sulfonate and sodium dodecylbenzene sulfonate.

15. The method for preparing an insulated wire of claim 14, before step 2, further comprising:
    preheating the core wire at a temperature of higher than 400° C.;
    wherein step 2 further comprises:
    heating the PEEK resin material to a molten state;
    with the rotation of a screw of a screw extruder, coating the surface of the core wire with the PEEK resin material evenly; and forming the PEEK resin insulating layer after cooling and crystallization.

16. The method for preparing an insulated wire of claim 14, wherein the bonding agent comprises, based on parts by weight, 50-80 parts of organic solvent, 20-30 parts of polyamide-imide resin and 2-8 parts of PEEK nano-powder material.

17. The method for preparing an insulated wire of claim 14, wherein the organic solvent comprises nitrogen-containing polar solvent, ether-based solvent, xylene or a mixture thereof; the nitrogen-containing polar solvent is specifically selected from one or more of N-methyl-2-pyrrolidone, N,N-dimethylformamide, N,N-dimethylacetamide, tetramethylurea and dimethylethyleneurea; and the ether-based solvent is specifically selected from one or more of diethylene glycol dimethyl ether, triethylene glycol dimethyl ether, tetraethylene glycol dimethyl ether, diethylene glycol and triethylene glycol.

18. The method for preparing an insulated wire of claim 14, wherein the polyamide-imide resin is amorphous resin with a glass transition temperature between 200° C. and 300° C.; and the polyamide-imide resin has an elastic modulus of 300-800 MPa.

19. An insulated wire, obtained by the method for preparing an insulated wire of claim 14.

20. An electronic/electrical device, comprising the insulated wire of claim 19.

* * * * *